United States Patent
Hart et al.

(10) Patent No.: US 8,305,942 B2
(45) Date of Patent: Nov. 6, 2012

(54) ESTIMATION OF EIGEN COHERENCE BANDWIDTH

(75) Inventors: Michael John Beems Hart, London (GB); Mythri Hunukumbure, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 12/134,643

(22) Filed: Jun. 6, 2008

(65) Prior Publication Data
US 2009/0225687 A1    Sep. 10, 2009

(30) Foreign Application Priority Data
Jun. 8, 2007 (GB) .................................. 0711101.6

(51) Int. Cl.
*H04J 1/00* (2006.01)
(52) U.S. Cl. ....................................................... 370/281
(58) Field of Classification Search .................. 370/280, 370/281
See application file for complete search history.

(56) References Cited

U.S. PATENT DOCUMENTS

| | | | |
|---|---|---|---|
| 7,146,134 B2 * | 12/2006 | Moon et al. ............... 455/67.11 |
| 2003/0003880 A1 | 1/2003 | Ling et al. |
| 2003/0086371 A1 * | 5/2003 | Walton et al. ................ 370/235 |
| 2004/0087324 A1 | 5/2004 | Ketchum et al. |
| 2004/0165684 A1 * | 8/2004 | Ketchum et al. ............. 375/343 |
| 2004/0196929 A1 | 10/2004 | Wendt et al. |
| 2006/0203708 A1 | 9/2006 | Sampath et al. |
| 2007/0082692 A1 * | 4/2007 | Tirkkonen et al. ........... 455/522 |
| 2007/0153931 A1 | 7/2007 | Lee et al. |
| 2007/0249296 A1 * | 10/2007 | Howard et al. ............... 455/101 |
| 2007/0263736 A1 * | 11/2007 | Yuda et al. .................... 375/260 |
| 2008/0198695 A1 * | 8/2008 | Abdi ............................. 367/134 |
| 2008/0233965 A1 * | 9/2008 | Kent et al. .................... 455/450 |

FOREIGN PATENT DOCUMENTS

| | | |
|---|---|---|
| JP | 2006-311286 | 4/2005 |
| WO | 02/067526 | 8/2002 |
| WO | 2006/035704 | 4/2006 |

OTHER PUBLICATIONS

Stankovic, Veljko; Multi-user MIMO wireless communications, Nov. 2006.*
Search Report issued by the UK Intellectual Property Office in the corresponding GB Application No. GB0711101.6; date of search Oct. 17, 2007.

(Continued)

*Primary Examiner* — Mark Rinehart
*Assistant Examiner* — Christopher R Crompton
(74) *Attorney, Agent, or Firm* — Myers Wolin, LLC

(57) ABSTRACT

Closed loop MIMO FDD schemes can offer significant performance gains for OFDM based wireless communication systems over open loop MIMO schemes. However, the precoding weights (eigenvectors) on each of the frequency bands need to be updated and this adds extra overhead. The number of adjacent frequency fingers which can use the same precoding weights is governed by the coherence bandwidth of the eigen spatial modes. The receiver uses the average r.m.s. delay spread of the SISO channels as an indicator to the eigen coherence bandwidth, rather than explicitly calculating the eigen coherence bandwidth itself. This technique can be applied to TDD schemes as well, where the channel estimation is done with the reverse link, eliminating the need for feedback. The TDD transmitter can estimate the eigen coherence bandwidth on the basis of average r.m.s. delay spread, which saves computational effort.

10 Claims, 4 Drawing Sheets

OTHER PUBLICATIONS

Official Office Action issued for corresponding Japanese Patent Application No. 2008-136013 mailed Jun. 5, 2012 with full English translation.

Final Office Action issued for corresponding Japanese Patent Application No. 2008-136013 mailed Sep. 4, 2012 with English translation.

* cited by examiner

ESTIMATION OF EIGEN COHERENCE BANDWIDTH

CROSS-REFERENCE TO RELATED APPLICATION

This application is based upon and claims the benefit of priority of the prior United Kingdom Patent Application No. GB0711101.6, filed on Jun. 8, 2007, the entire contents of which are incorporated herein by reference.

The present invention relates to wireless communication systems, and more particularly to wireless communication systems having MIMO capability, especially but not exclusively OFDM systems.

An OFDM (Orthogonal Frequency Division Multiplex)-based communications scheme divides data symbols to be transmitted among a large number of subcarriers (also called frequency fingers) which are equally spaced in frequency, hence frequency division multiplexing. By carrying only a small amount of data on each subcarrier, the bit rate per subcarrier is kept low and hence intersymbol interference is reduced. Data is modulated onto a subcarrier by adjusting its phase, amplitude, or both phase and amplitude.

Fading is a common problem in wireless communication systems, particularly where the transmitter and/or receiver is mobile. The term refers to variations in signal strength at the receiver due to the superposition of signals received along multiple propagation paths (multipath reflections), each having their own path loss, delay time and Doppler shift. OFDM systems are made resistant to fading by ensuring that the total bandwidth, occupied by the subcarriers, is greater than the "coherence bandwidth" of the fading channel. In this way, even if some subcarriers are affected by multipath fading, the others should still be received correctly.

Coherence bandwidth is the statistical average bandwidth of the channel, over which signal propagation characteristics are correlated, and is formally defined as the bandwidth for which the autocovariance of the signal amplitudes at the extremes reduces from 1 to 0.5 (autocovariance refers to an autocorrelation occurring in a zero-mean process).

The "orthogonal" part of the name OFDM refers to the fact that the spacings of the subcarriers are specially chosen so as to be orthogonal, in a mathematical sense, to the other subcarriers. More precisely, they are arranged along the frequency axis such that the sidebands of adjacent subcarriers are allowed to overlap but can still be received without inter-subcarrier interference, commonly referred to as ICI. In mathematical terms, the sinusoidal waveforms of each subcarrier are called eigen functions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users of the wireless communication system, the result is a multi-access system referred to as OFDMA. (In this specification, the term OFDM is henceforth to include OFDMA). By employing frequency hopping, i.e. by switching the set of subcarriers assigned to each user periodically, such as after every symbol, the effects of fading on any one user can be further reduced.

Because of multipath reflections, the received OFDM signal includes a series of peaks of successively-lower energy occupying a certain delay time as shown in FIG. 2. As a measure of this delay time, the rms (root-mean square) delay spread, as indicated in the Figure, is commonly used. R.m.s. delay spread is defined as the square root of the second central moment of the power delay profile (see equation (1) later in this specification). The r.m.s. delay spread can be thought of as the amount of dispersion in the wireless communication channel, and it affects the symbol duration which can be used in the channel. To provide more information about the properties of a channel under real-world multipath conditions, a scatter diagram is often used to plot the results of measuring the channel.

A further modification of the basic OFDM scheme is called MIMO OFDM, where MIMO stands for multiple-input multiple-output. This scheme employs multiple antennas at both the transmitter and the receiver. For example, a 4×4 MIMO channel is one in which transmitter and receiver communicate with one another each using four antennas. So long as the antennas are sufficiently spatially separated, they are differently affected by fading, allowing data symbols to be more easily recovered. Incidentally, there is no need for the transmitter and receiver to employ the same number of antennas. For example, a base station in a wireless communication system can more easily be equipped with many antennas in comparison with a mobile handset, owing to differences in power and size limitations.

The MIMO channel is the frequency (or equivalently time delay) response of the radio link between the transmitter and receiver. It contains all the L fingers or sub-carriers, and covers the whole bandwidth of transmission. A MIMO channel contains many individual radio links hence it has N SISO channels (sometimes called sub-channels). For example, the 2×2 MIMO depicted in FIG. 1 contains 4 links, hence it has 4 SISO channels.

MIMO transmission schemes include so-called non-adaptive and adaptive configurations. In the non-adaptive case, the transmitter does not have any knowledge of the channel properties and this limits performance, as the transmitter cannot take account of changes in conditions (channel profile). Adaptive schemes rely on the receiver feeding back information (channel-state information or CSI) to the transmitter, or locally deriving the CSI, allowing it to adapt the transmitted signal to changing conditions and maximise data throughput.

Closed loop systems are required in FDD (Frequency Division Duplex) systems, where the uplink (mobile to base station) and downlink (vice-versa) employ two different carrier frequencies. Because of the frequency change, the uplink and downlink channels are different and channel information (like the coherence bandwidth in this case) needs to be fed back. In TDD (Time Division Duplex) systems the uplink and downlink are transmitted in two adjacent time slots on the same frequency. The two time slots are within the channel coherence time (the channel does not change) so the channel information need not be fed back. The transmitter can estimate the channel from the received signal on the reverse link.

FIG. 1 shows a simple 2×2 closed-loop MIMO configuration in which a transmitter 10 takes data symbols $d_1$, $d_2$, applies preceding and other signal processing to obtain transmit signals $s_1$, $s_2$, and transmits these via multiple antennas 12 to a receiver 20. The receiver 20 takes received signals $r_1$, $r_2$ from its multiple antennas 22, and performs channel estimation and symbol detection to derive recovered data symbols $d_1\hat{}$, $d_2\hat{}$. A feedback path 24 from the receiver to the transmitter carries the feedback signals for informing the transmitter of the channel properties.

Typically, MIMO configurations involve pre-coding at the transmitter, whereby the data symbols to be transmitted are weighted using eigenvectors of each subcarrier. This effectively allows the MIMO channel to be decomposed into a set of parallel SISO channels, so-called eigenmode signalling. However, in a closed loop configuration, the amount of information required to be fed back for complete channel knowledge at the transmitter (required to update the eigenvectors), quickly grows very large for MIMO-OFDM with many antennas or many multipath delays that result in small coherence bandwidth.

Even in an open loop configuration, although there is no need for information to be fed back to the transmitter, there is still the calculation burden at the transmitter to be considered.

In either configuration, the pre-coding weight of each frequency band needs to be constantly updated. The width of this band is dependent upon the coherence bandwidth of the eigen spatial modes of the MIMO channel. Calculation of this coherence bandwidth is based on obtaining the eigenvalues from the MIMO channel matrices across the OFDM frequency spectrum and observing the auto-covariance functions. The eigen decomposition of many channel matrices require a high computational effort. This tends to increase the complexity, cost, and power consumption of the receiver (in a closed loop configuration) or of the transmitter (open loop configuration).

Consequently, there is a need to reduce the amount of processing and signaling overhead involved in deriving Eigen coherence bandwidth in an OFDM wireless communication system.

According to one aspect of the present invention, there is provided a MIMO wireless communication method comprising steps of: transmitting MIMO signals from a transmitter to a receiver; estimating the Eigen coherence bandwidth of a MIMO channel on the basis of an r.m.s. delay spread; and adjusting one or more parameters used in said transmitter on the basis of said Eigen coherence bandwidth estimate, prior to repeating the transmitting step.

The above method has two basic configurations, the first being a closed-loop FDD method in which the above-mentioned MIMO channel carries the signals transmitted on a downlink from the transmitter to the receiver.

In this method, preferably, the estimating step is performed in the receiver, and the receiver provides, on an uplink, feedback signals to the transmitter including a value indicative of the Eigen coherence bandwidth.

In addition, preferably, the transmitter transmits the downlink signals on L frequency fingers (subcarriers), the receiver detects a channel gain and delay time for each of the L frequency fingers in a SISO channel, and for each of a plurality of such SISO channels derived from the MIMO signals, and the estimating step includes converting the channel response into the time domain to yield a channel gain and a delay time for each SISO channel, and calculating the average r.m.s. delay spread of the SISO channels from the channel gains and the delay times.

The second basic configuration is an open-loop TDD method in which the above-mentioned MIMO channel is an uplink carrying signals transmitted back to the transmitter from the receiver. In other words, the uplink is used for channel estimation and the estimating step is performed at the transmitter.

In either case, the method is preferably applied to an OFDM system (which can include OFDMA).

Further aspects of the present invention provide a receiver for use in a MIMO FDD wireless communication system, a transmitter for use in a MIMO TDD wireless communication system, and software capable of being run on a processor of a mobile station or a base station of a wireless communication system to act as the receiver and/or the transmitter.

BRIEF DESCRIPTION OF THE DRAWINGS

Reference is made, by way of example only, to the accompanying drawings in which.

DETAILED DESCRIPTION

Figure 1:
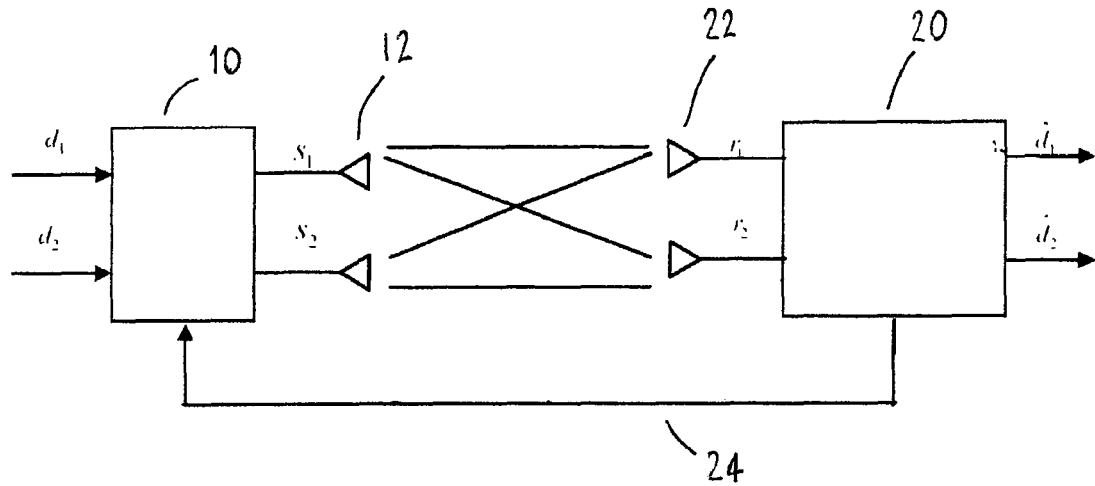
FIG. 1 illustrates a simple MIMO configuration of transmitter and receiver.

As described above, adaptive MIMO schemes can offer significant performance gains for OFDM based FDD (Frequency Division Duplex) systems over the non-adaptive MIMO schemes. However, the pre-coding weights (which are the eigenvectors) on each of the frequency bands need to be updated and this adds extra overhead. The number of adjacent subcarriers (henceforth referred to as frequency fingers) which can use the same pre-coding weights is governed by the coherence bandwidth of the eigen spatial modes. If the eigen coherence bandwidth can be determined by some other method, the eigenvectors need to be calculated only once for a coherence band as these weights can be used throughout the band. Also, this reduces the amount of feedback information.

Even for MIMO OFDM TDD (Time Division Duplex) systems where the channel can be estimated through the reverse link and the need for feedback is non-existent, the computational effort at the transmitter can be significantly reduced if the eigen coherence bandwidth can be determined by some simpler method.

To explain this further, adjacent fingers are subsets of the total L sub-carriers and they are close in frequency. Each subset will contain K sub-carriers (determined by the eigen coherence bandwidth) and there will be L/K subsets. The total L sub-carriers make up the radio channel and hence these subsets represent portions of the channel.

It should be noted that the eigen coherence bandwidth can only be estimated for the combined MIMO channel, which in turn is estimated from the received signals (through pilot bits). A MIMO channel matrix is required for the estimation of eigen values. For example in the 2×2 MIMO channel, this channel matrix is built by considering the channel gains (in 2×2 formation) for a single frequency finger. The variation of these eigen values across the L frequency fingers gives the eigen coherence bandwidth. The r.m.s. delay spread, however, can be calculated only for the constituent SISO channels in the combined MIMO channel. The channel is converted to time domain and the r.m.s. delay spread is calculated using equation (1) stated below. For a 2×2 MIMO channel, the r.m.s. delay spread needs to be calculated for 4 SISO channels and the average taken.

Thus, this invention uses the average r.m.s. delay spread of the SISO channels as an indicator of the eigen coherence bandwidth, rather than explicitly calculating the eigen coherence bandwidth itself. It is shown that a one-to-one relationship can be found between the eigen coherence bandwidth and the r.m.s. delay spread.

The benefits of this invention lie with the considerable savings in computational efforts in avoiding the calculation of eigen coherence bandwidths. The MIMO channel matrix needs to be subjected to eigen value decomposition and the variation of eigen values across the frequency band needs to be traced. The r.m.s delay spread calculation is a straight forward linear computation which requires considerably less computational effort. The relationship between the two parameters can be stored in a look-up table.

Thus, the present invention uses the r.m.s delay spread as a means of estimating the eigen coherence bandwidth. The inverse linear relationship between the classical channel bandwidth and the r.m.s delay spread is well documented: see for example, W. C. Jakes, *Microwave Mobile Communications*, IEEE classics re-issue, IEEE Press, New Jersey, U.S., 1994, the entire contents of which are hereby incorporated by reference. The present inventors have investigated if this relationship extends to the eigen space and found evidence that it does so.

Finding the eigenvalues of the N×N channel matrix requires solving the characteristic equation, which is an $N^{th}$ order polynomial. The calculation of r.m.s. delay spread ($\tau_{rms}$) is computationally much simpler as shown by the equation (1) below. The channel response with L frequency fingers (L subcarriers in the OFDM system) is converted to the delay domain through inverse Fourier transform to yield channel gains $h_i$. $\tau_i$ is the delay for each channel gain $h_i$ and $\tau_m$ is the mean delay spread.

$$\tau_{rms} = \sqrt{\frac{\sum_{i=1}^{L}(\tau_i - \tau_m)^2 h_i^2}{\sum_{i=1}^{L} h_i^2}} \quad \text{with} \quad \tau_m = \frac{\sum_{i=1}^{L} \tau_i \cdot h_i^2}{\sum_{i=1}^{L} h_i^2} \quad (1)$$

Figure 3:
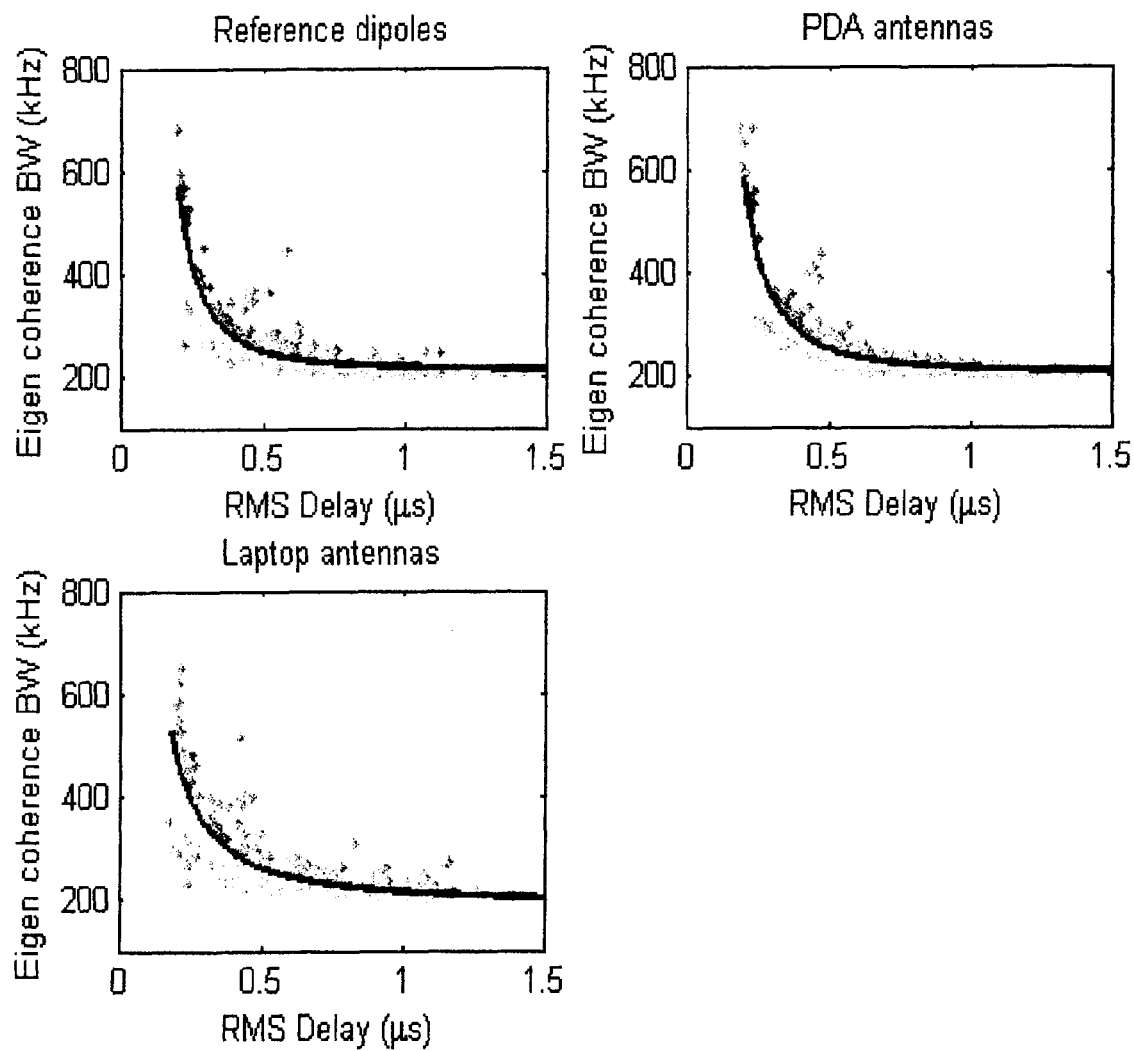
FIG. 3 shows scatter plots for Eigen coherence bandwidth vs. r.m.s delay spread.

FIG. 3 plots the results obtained from analyzing measured channel data, obtained with three different receiver antenna types. These antenna types (particularly, PDA antennas and laptop antennas) assume the use of the technique on the downlink in a wireless communication system, but it can also be applied on the uplink, i.e. with a mobile station acting as the transmitter and a base station or a relay station acting as the receiver. The eigen coherence bandwidth of the maximum eigenvalues of the 4×4 MIMO channel matrices are plotted against the average r.m.s. delay spreads of the constituent 16 SISO channels. The best fit inverse power curves are also included in these scatter plots.

The inverse power relationships can be expressed in the form of $y=a.x^b+c$. The coefficients a, b, c and the goodness of fit given by adjusted $R^2$ (Adj. $R^2$) are tabulated below. A perfect fit would result in Adj.$R^2=1$.

TABLE 1

Parameters of the best fit curves for Eigen coherence bandwidth vs. r.m.s. delay spread relationship

| Antenna Type | a | b | c | Adj. $R^2$ |
|---|---|---|---|---|
| Reference dipoles | 6.55 | −2.48 | 211.6 | 0.82 |
| PDA | 9.72 | −2.28 | 203.5 | 0.72 |
| Laptop | 25.7 | −1.5 | 187.9 | 0.69 |

For a given set of parameters, the $y=a.x^b+c$ relationship can be stored in a look-up table for incremental values of x ($\tau_{rms}$).

Figure 4:
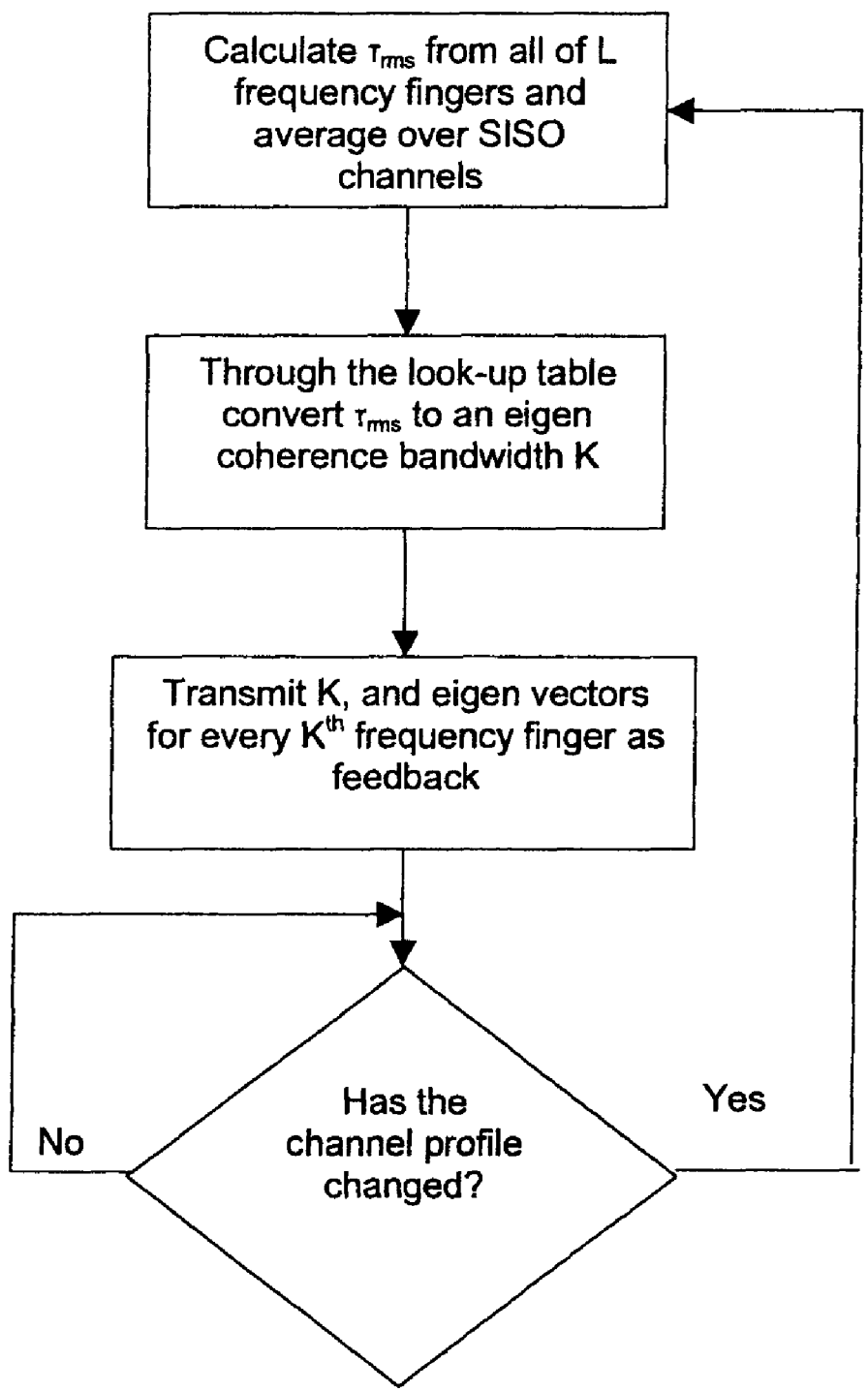
FIG. 4 is a flow chart for a closed loop MIMO system incorporating the present invention.

FIG. 4 illustrates the procedures involved in a closed loop FDD MIMO OFDM system, which incorporates this invention. Preferably, all the steps shown here are carried out at the receiver. If the transmitter were to do the processing, then all the coefficients in the channel matrix would need to be fed back by the receiver, consuming a lot of overhead.

Figure 2:
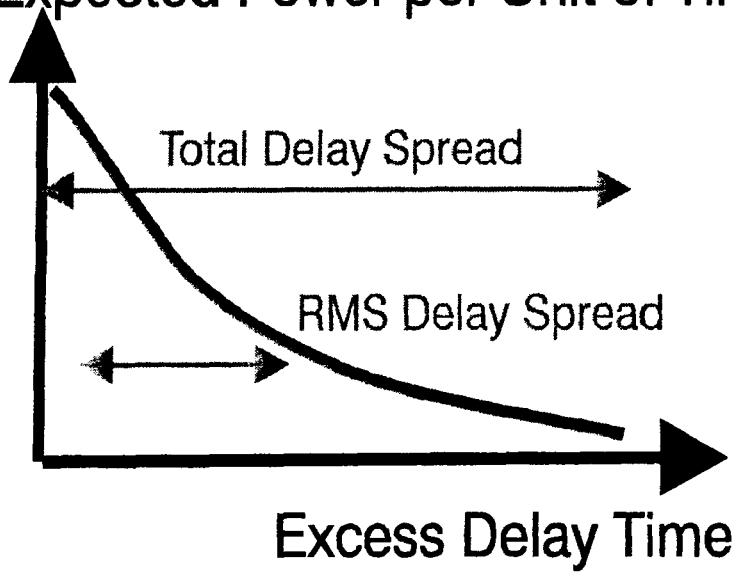
FIG. 2 is a schematic power/delay time curve showing r.m.s. delay spread.

As is clear from FIG. 2, the process starts with the receiver calculating the mean r.m.s. delay spread for each SISO channel from the r.m.s. delay spread of all of the L fingers in the time (or delay) domain. The mean r.m.s. delay spread is found over the N SISO channels. By calculation or, preferably, through use of a LUT, the receiver converts the mean r.m.s. delay spread to an Eigen coherence bandwidth K, which in this case is in units of number of frequency fingers, but could be in some other pre-determined unit. This (or a value indicative of the same, which could be a relative or absolute value), is included in the feedback signals transmitted back to the transmitter. Although not shown in FIG. 2, the transmitter adjusts the preceding applied to the transmitted signal as appropriate, applying the same precoding to every set of K frequency fingers. Periodically, the receiver checks for a change in the channel profile. Here, "channel profile" refers to the channel impulse response for the wideband channel, showing the channel coefficients at each delay tap, or equivalently, the frequency response. A change in channel profile is judged by monitoring the channel coherence time, i.e. the time taken for the channel correlation to fall below 0.7 (or some other fraction) of a threshold. Typically, the channel coherence time in an outdoor environment will vary from around 5 ms to 50 ms, so it is appropriate to perform this check every 5 ms. If the channel profile has changed, the process flow returns to the start to recalculate the r.m.s. delay spread.

Figure 5:
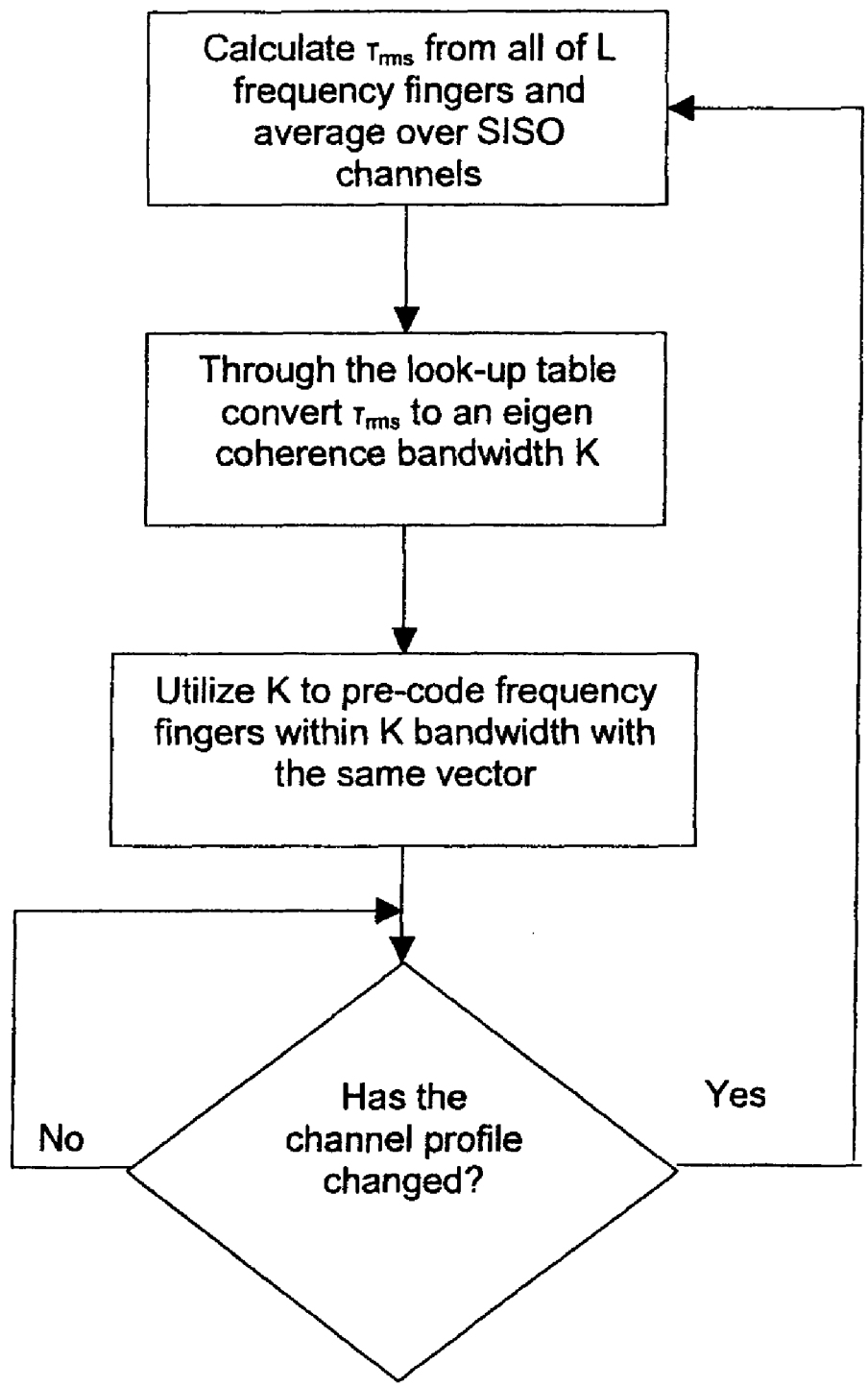
FIG. 5 is a flow chart for an open loop MIMO system incorporating the present invention.

As mentioned above, the present invention is not confined to closed-loop configurations and may also be applied to the open loop case, as is typically found in TDD MIMO OFDM systems. FIG. 5 illustrates the flow of operation in this case. In the TDD system all the processing takes place at the transmitter. As will be apparent, the difference, compared with FIG. 4, is that the step of the receiver transmitting special feedback information on the uplink, is replaced by a step of the transmitter utilizing a value of K detected from ordinary received signals on the uplink to determine the preceding to be applied on the downlink.

Thus, in the case of TDD MIMO ODFM systems, it is still beneficial to incorporate this invention. The transmitter itself can calculate the r.m.s. delay spreads from the SISO channels and use this information in a look up table to determine the eigen coherence bandwidth. The same eigen vectors can be applied to the frequency fingers within this coherence bandwidth. In such a configuration, the present invention gives the same computational benefits as before. The only difference is now the calculations are done at the transmitter itself and there is no need for feedback.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

Such a microprocessor or DSP may be present in a mobile station or a base station, or preferably both, in a wireless communication system. In the above-described FDD embodiment, it is preferable for at least the mobile stations of the system to include the functionality of the receiver. In the above-described TDD embodiment, it is preferable for at least the base station(s) to include the functionality of the transmitter. Typically, both mobile stations and base stations will be able to act as either the receiver or the transmitter as claimed. In a wireless communication system employing relay stations, it will be further preferable for each relay station to include the functionality of the receiver and/or the transmitter according to the present invention.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

What is claimed is:

1. A Multiple-Input, Multiple Output (MIMO) wireless communication method comprising:
   transmitting precoded MIMO signals at least from a transmitter to a receiver;
   estimating the Eigen coherence bandwidth of a MIMO channel on the basis of a root mean square (r.m.s.) delay spread ($T_{rms}$); and
   adjusting one or more precoding parameters used in said transmitter on the basis of said Eigen coherence bandwidth, prior to repeating the transmitting,
   wherein the method is a closed-loop Frequency Division Duplex (FDD) wireless communication method in which the estimating is performed in the receiver, and the receiver provides feedback signals to the transmitter including a value (K) indicative of the Eigen coherence bandwidth, the transmitter transmitting the MIMO signals on a plurality (L) of frequency fingers; the receiver detecting a channel gain and delay time for each of the L frequency fingers in a Single-Input Single Output (SISO) channel, and for each of a plurality of such SISO channels derived from the MIMO signals; and
   said estimating includes converting the channel response into the time domain to yield a channel gain and a delay time for each SISO channel, and calculating the average r.m.s, delay spread of the SISO channels from the channel gains and the delay times.

2. The method according to claim 1, wherein the transmitter adjusts a precoding applied to the signals transmitted on the plurality (L) of frequency fingers, on the basis of the feedback signals, said value (K) indicative of Eigen coherence bandwidth being used as a number of adjacent frequency fingers to which to apply the same precoding, and wherein the feedback signals further comprise information representing eigenvectors for every K-th frequency finger.

3. The method according to claim 1, further comprising periodically checking for a change in a channel profile and repeating said estimating upon occurrence of a change.

4. The method according to claim 3 wherein the checking is performed on the basis of a channel coherence time.

5. A non-transitory computer-readable medium storing software which, when executed by a processor of a mobile station in a wireless network, operates the mobile station in accordance with the method of claim 1.

6. A receiver for use in a closed-loop Frequency Division Duplex (FDD) Multiple-Input, Multiple Output (MIMO) wireless communication system to receive precoded MIMO signals from a transmitter, including multiple antennas for receiving the signals, the receiver arranged to perform channel estimation on the received signals and determine the Eigen coherence bandwidth of the channel on the basis of a root mean square (r.m.s.) delay spread thereof, and to feed back signals for precoding to the transmitter, the feedback signals being indicative of the Eigen coherence bandwidth, further arranged to detect a channel response with a plurality (L) of frequency fingers for each of a plurality of channels, the receiver arranged to convert the channel response into the time domain to yield a channel gain and a delay time for each channel, and to calculate the r.m.s, delay spread from the channel gains and the delay times.

7. The receiver according to claim 6 further arranged to include, in said feedback signals, information representing the eigenvectors for every K-th frequency finger.

8. The receiver according to claim 6, further arranged to check periodically for a change in a channel profile, said receiver being responsive to a change thus determined.

9. The receiver according to claim 8, further arranged to perform said check by determining a channel coherence time.

10. A MIMO FDD wireless communication system comprising the receiver according to claim 6 in combination with at least one transmitter arranged to receive said feedback signals and to adjust one or more characteristics of said transmitted signals on the basis of said feedback signals.

* * * * *